United States Patent Office 3,369,621
Patented Feb. 20, 1968

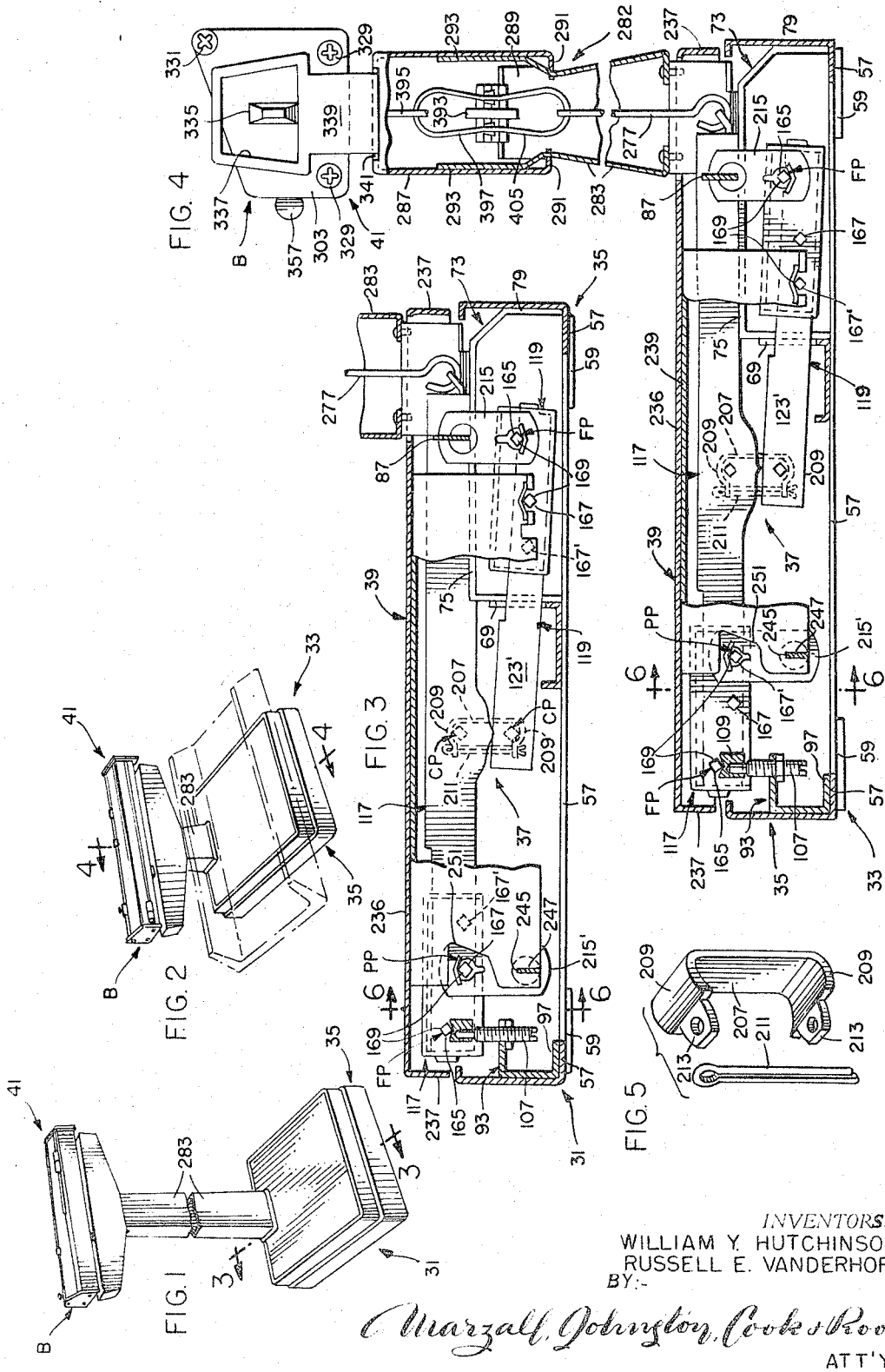

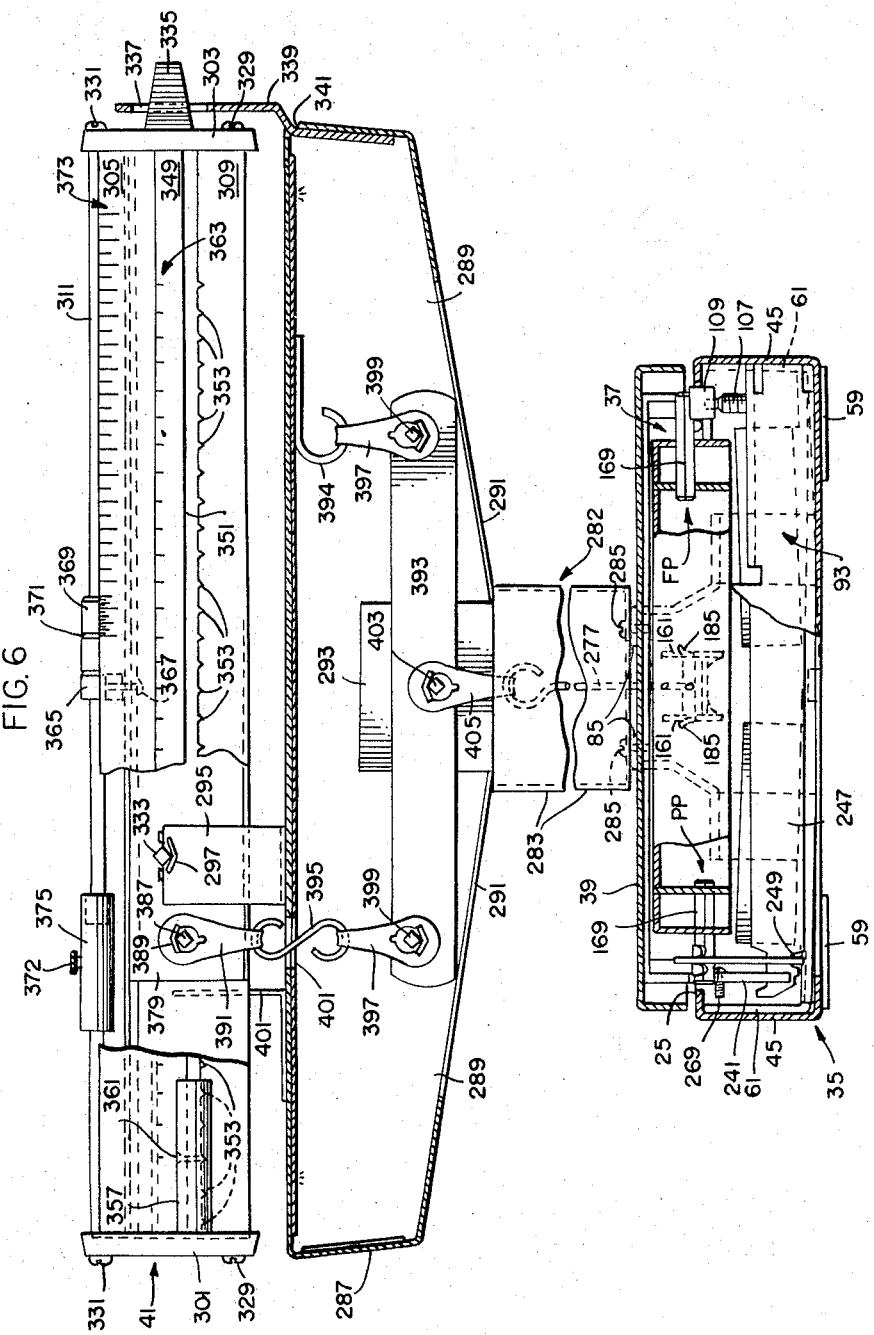

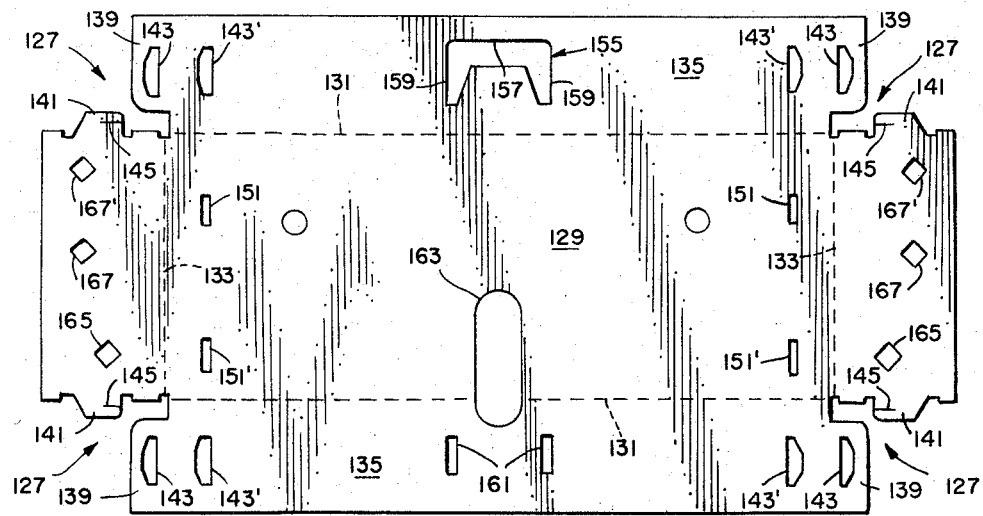

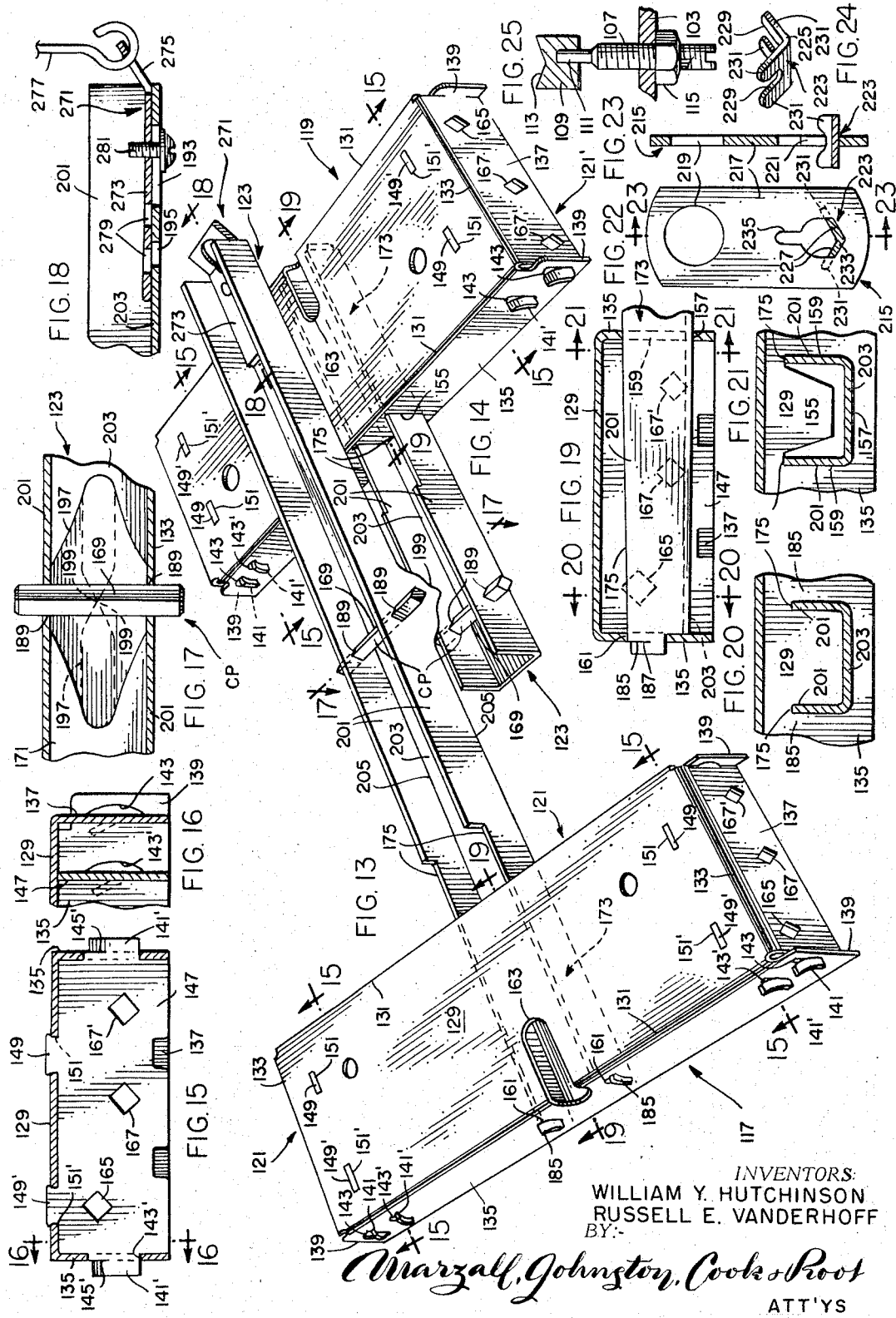

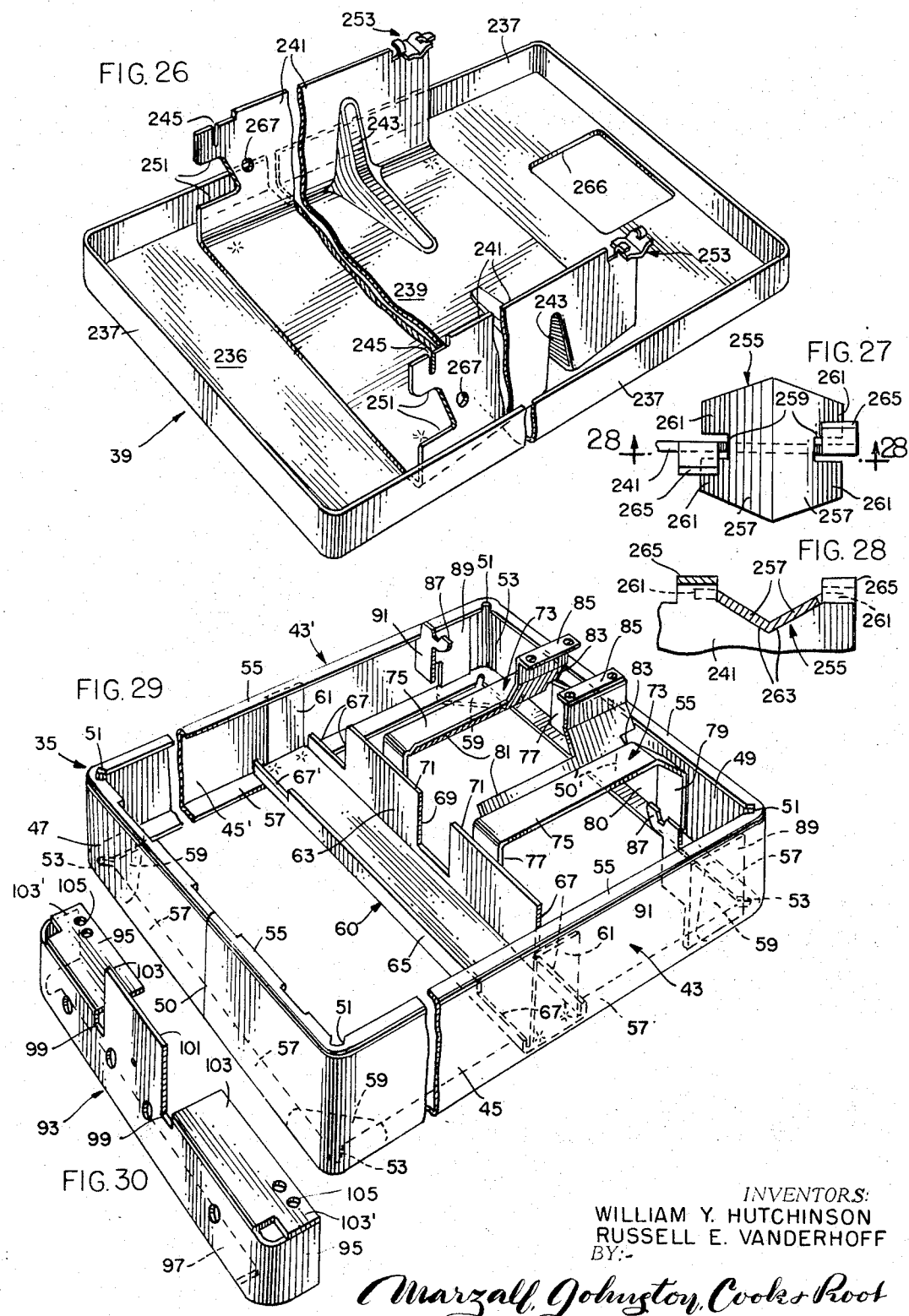

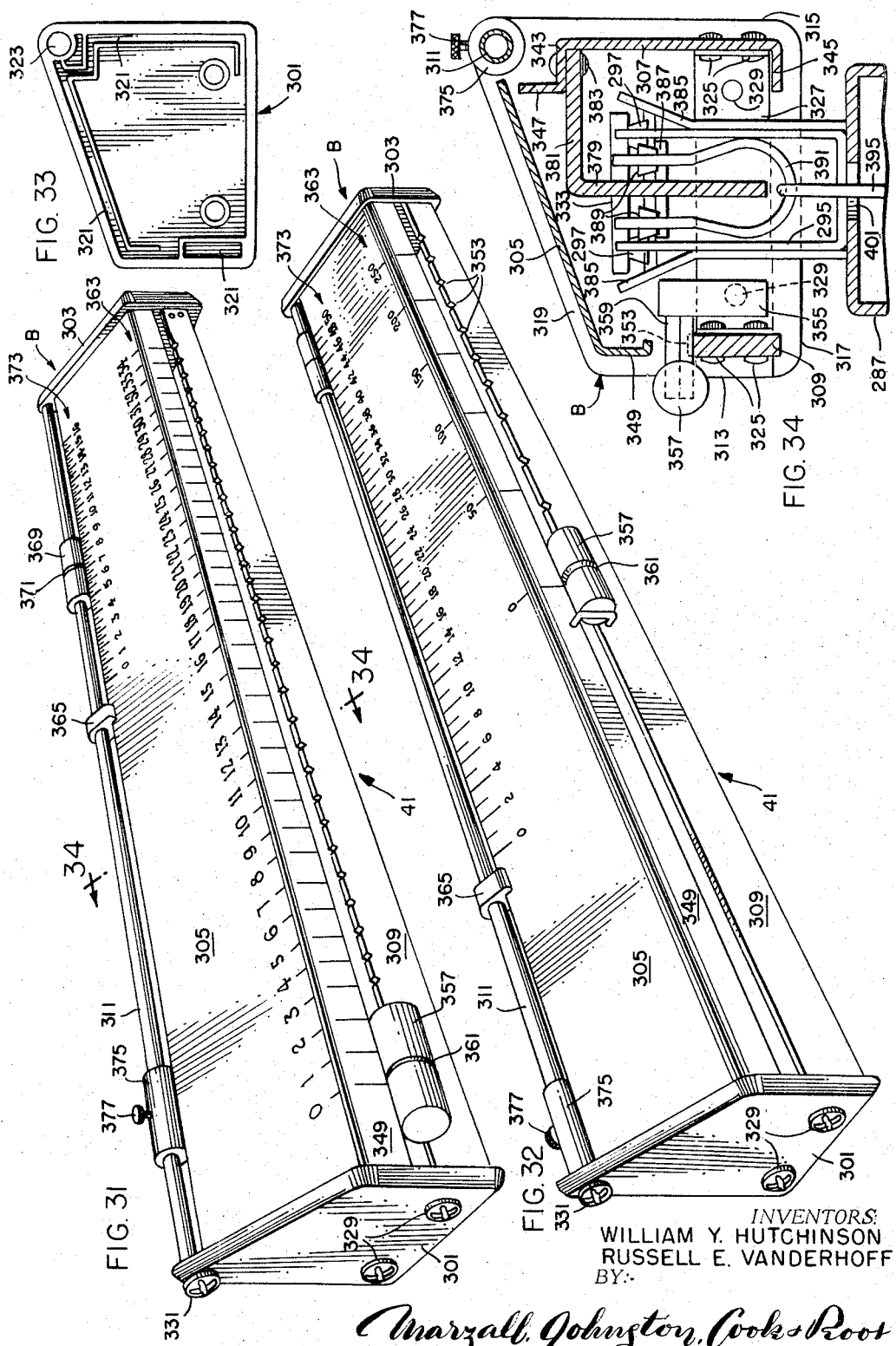

3,369,621
WEIGHING SCALE
William Y. Hutchinson, Chicago, and Russell E. Vanderhoff, Oak Lawn, Ill., assignors to Continental Scale Corporation, Chicago, Ill., a corporation of Delaware
Filed July 12, 1965, Ser. No. 471,057
19 Claims. (Cl. 177—257)

ABSTRACT OF THE DISCLOSURE

Weighing scale structure embodying a weight receiving platform supported on a system of counterbalanced levers, formed of sheet metal and housed in a supporting base, each lever having a rigid, box-like, pivot carrying portion, and an arm projecting outwardly of a side of said portion, the invention also relating to improved pivot bearing structures, including novel suspension bars and yokes; to an improved weight counterbalancing and measuring steelyard beam structure; to an improved scale supporting base embodying novel base-rigidifying constructions; and to a novel arrangement for adjusting the effective length of a base enclosed weighing lever.

---

The present invention relates in general to weighing scales, and has more particular reference to scales having weight receiving platforms disposed relatively close to the floor or other supporting structure upon which the scales are or may be disposed for use.

An important object of the invention is to provide a lightweight weighing scale preferably fabricated principally of sheet metal parts; a further object being to form the sheet metal components so that the weight carrying elements of the structure have adequate rigidity to thereby minimize weight measuring error through deflection of the parts when loaded with the weight being measured.

Another important object is to provide a scale embodying weight receiving levers rockably mounted upon a support frame and connected to actuate weight indicating means also mounted on the support frame, wherein the frame comprises a preferably box-like structure embodying sheet metal parts formed and arranged to impart optimum rigidity in the frame, including transversely and longitudinally extending frame rigidifying members of formed sheet metal assembled and integrally secured in the structure to brace and rigidify the same and to rigidly mount lever support bearings therein.

Another important object is to provide a weighing scale having a weight receiving platform supported on weighing levers mounted in a support frame, the platform comprising a relatively flimsy piece of sheet metal preferably having dependent marginal flanges at its periphery, and a bracing plate of sheet metal rigidly secured to the underside of the platform, as by spot welding the parts together, the bracing plate having dependent panels and diagonal corner flutes interconnecting the plate and panels to brace, strengthen and rigidify the platform structure, said dependent panels extending at the opposite sides of the platform and forming spaced feet in position for connection with the weighing levers to support the platform thereon.

Another important object is to provide a scale embodying opposed weighing levers comprising sheet metal stampings having marginal rigidifying flanges to strengthen the levers and prevent deflection thereof under load; a further object being to provide opposed levers both preferably comprising identical pivot carrying structures of shallow box-like configuration, the same each consisting of a rectangular piece of sheet metal having excised corners permitting the marginal portions of the sheet to be bent downwardly to form rigidifying flanges, the adjacent ends of which may be rigidly interconnected at the corners of the box-like structures, said levers also comprising each a channel-shaped arm rigidly mounted in the box-like structure of the lever, as on its marginal dependent flanges which extend at the opposite sides of the box-like structure, medially between the opposite ends thereof, said arms each projecting from and at right angles to a side of the box-like structure on which it is mounted.

Another important object is to provide for the firm attachment of knife-edge support elements at the opposite ends of the box-like lever structures; a further object being to provide the box-like structures with partitions extending parallel and inwardly of their dependent end flanges, and to form alined openings for the press-fitted reception of the knife-edge support elements in said partitions and dependent end flanges; a still further object being to provide for mounting alined fulcrum pivots at the opposite ends of each box-like structure, and to provide openings for the selective mounting of platform supporting pivots on the levers at different distances from the fulcrum pivots, whereby the levers may be constituted at will for the measurement of platform carried weights in different weight ranges, as, for example, in the 0–35 lb. range commonly provided in scales for weighing relatively light objects, such as babies, and in the 0–300 lb. range commonly provided for weighing relatively heavy objects such as adults.

Another important object is to provide weighing apparatus embodying weight receiving levers operatively supported in a suitable frame and connected to actuate a preferably frame mounted weight indicator, wherein the structure of the lever means is such that weight receiving knife-edge elements may be selectively assembled on the lever means, at various desired distances from the fulcrum pivots thereof, whereby identical components may be assembled to constitute lever means operable in unlike weight determining ranges.

Another important object is to provide an improved steel yard weighing beam for a weighing scale, including improved means for adjusting weights on the beam for the purpose of determining and indicating a weight to be measured.

Another important object resides in providing a steel yard weighing beam comprising plate-like end members and formed sheet metal panels or strips extending between and secured to said end members to form an elongated box-like structure providing surfaces on which weight indicating scales may be applied in highly visible, readily legible fashion; a further object being to arrange a pair of the sheet metal elements to form a slot therebetween for the movement of a counterbalance weight along the steel yard, between the plate-like end members thereof and adjacent a weight indicating scale on the steel yard; a still further object being to incorporate a counterbalance weight carrying rod in the steel yard structure, adjacent an edge of a said formed sheet metal component, the rod being secured at its opposite ends in the plate-like end members of the structure and a weight indicating scale being formed on the sheet metal component, at and along its edge adjacent said rod, to show the adjusted position of a counterbalance weight on the rod.

Another important object is to provide a weighing scale comprising component parts adapted for assembly either as a low or as a high weight range scale.

The foregoing and numerous other important objects, advantages, and inherent functions of the invention will become apparent as the same is more fully understood from the following description which, taken in connection with the accompanying drawings, discloses a preferred embodiment of the invention.

Referring to the drawings:
FIGS. 1 and 2 are perspective views of weighing scales embodying the present invention, the scales being adapted for weight measurement in unlike weight ranges;

FIGS. 3 and 4 are sectional views respectively taken substantially along the line 3—3 in FIG. 1, and along the line 4—4 in FIG. 2;

FIG. 5 is a perspective view of a connecting link and retaining cotter pin employed in each of the structures shown in FIGS. 3 and 4;

FIG. 6 is a sectional view taken substantially along the lines 6—6 in FIGS. 3 and 4;

FIG. 7 is a plan view of a piece of sheet metal of which the box-like components of the levers shown in FIGS. 3 and 4 may be formed;

FIG. 8 is a plan view of a sheet metal partition of the sort used in the box-like components of the levers;

FIG. 9 is a side view of a knife-edge component of the sort used in the levers;

FIG. 10 is an enlarged sectional view taken along the line 10—10 in FIG. 9;

FIG. 11 is a plan view of a piece of sheet metal of which the channel-shaped arm of one of the weighing levers is formed;

FIG. 12 is a plan view of a piece of sheet metal of which the channel-shaped arm of another of the weighing levers is formed;

FIGS. 13 and 14 are perspective view of a pair of opposed weighing levers of the sort forming components of the scale structures shown in FIGS. 3 and 4;

FIGS. 15, 17, 18 and 19 are sectional views respectively taken along the lines 15—15, 17—17, 18—18, and 19—19 in FIGS. 13 and 14;

FIGS. 16, 20 and 21 are sectional views respectively taken substantially along the line 16—16 in FIG. 15, and along the lines 20—20 and 21—21 in FIG. 19;

FIG. 22 is a side view of a suspension link of the sort used as a component in the structure depicted in FIGS. 3 and 4;

FIG. 23 is a sectional view taken substantially along the line 23—23 in FIG. 22;

FIG. 24 is a perspective view of a knife-edge bearing seat forming a component of the suspension link shown in FIGS. 22 and 23;

FIG. 25 is an enlarged view of an adjustable bearing support pedestal that is embodied in the structures shown in FIGS. 3 and 4;

FIG. 26 is a perspective view showing the underside of a weight carrying platform of the sort forming a component of the structures shown in each of FIGS. 3 and 4;

FIG. 27 is an enlarged plan view of a knife-edge bearing saddle structure which forms a part of the platform assembly shown in FIG. 26;

FIG. 28 is a sectional view taken substantially along the line 28—28 in FIG. 27;

FIG. 29 is a perspective view of a sheet metal frame or support base forming a part of each of the structures shown in FIGS. 3 and 4;

FIG. 30 is a perspective view of a sheet metal rigidifying member which forms a part of the frame illustrated in FIG. 29;

FIGS. 31 and 32 are perspective views of weighing beams embodying the present invention and adapted for weight measurement in unlike weight measuring ranges;

FIG. 33 is an inside face view of an end member of the weighing beams shown in FIGS. 31 and 32; and FIG. 34 is a sectional view taken substantially along the line 34—34 in FIG. 31.

To illustrate the invention the drawings show weighing scales 31 and 33 each comprising identical parts assembled so that the scales will operate in different weight measuring ranges, the scale 31, shown in FIGS. 1 and 3, being adapted to function within a relatively wide weighing range, such as the 0–300 lb. or adult weighing range, while the scale 33, shown in FIGS. 2 and 4, may be adapted for operation in a narrower weighing range, such as the 0–35 lb. or baby weighing range.

As shown, both scales may comprise a main support frame or base 35 upon which is mounted a system of weighing levers 37 supporting a weight receiving platform 39, means for counterbalancing the lever system and for indicating a weight applied on the platform for measurement being also mounted on the support frame 35. The counterbalancing and weight indicating means, in the illustrated embodiments, comprise steel yard weighing beams 41.

The frame 35, of course, may be of any suitable construction; but, as shown, it may comprise a generally rectangular structure formed from a pair of sheet metal strips 43, 43', bent to provide opposite side walls 45, 45', a front wall 47 and a rear wall 49, said front and rear walls comprising the opposite ends of the strips disposed in coplanar alinement and abutting engagement along the parting lines 50, 50'. The opposite side edges of the strips 43, 43' may be formed with transversely registering notches 51, 53 to permit said side edges to be bent inwardly at right angles with respect to the medial portions of the strip in order to form inturned flanges 55 and 57 along the upper and lower edges of the walls 45, 47 and 49. Preferably triangular feet plates 59 may be spot welded to the adjacent ends of the flanges 57 at the corners of the frame.

In order to strengthen and brace the frame 35 and to make it rigid, a transverse bracing member 60 may be mounted in position extending between and secured to the spaced side walls 45, 45', medially between their opposite ends, said transverse member comprising a sheet metal strip extending between the walls and resting at its opposite ends on the flanges 57, said opposite ends being preferably spot welded or otherwise integrally united with the flanges. The strip preferably has upwardly bent extensions forming connection tabs 61 overlying and welded or otherwise secured firmly upon the inner surfaces of the walls 45, 45'. The bracing member 60 may also be formed with rigidifying flanges extending along its opposite side edges between the walls 45, including a relatively wide upwardly extending flange 63 along the edge of the member nearest the rear wall 49 of the frame and a relatively narrower upstanding flange 65 extending along the opposite edge of the bracing member. The upper portions of the flange 63 may be cut away to form openings 67 adjacent the walls 45, the flange 65 being formed with comparable cutaway portions 67'. The upper portions of the flange 63 may also be centrally notched to form an opening 69 and to define spaced upstanding flange portions 71 on opposite sides of the opening 69 and between it and the cutaway portions 67.

In order to further brace and rigidify the rear portions of the frame 35 and to form firm support for the weight counterbalancing and indicating mechanism 41, a pair of formed sheet metal straps 73 may be mounted on and between the rear wall 49 of the frame and the upstanding flange portions 71, on opposite sides of the opening 69, said straps having medial portions 75 disposed in coplanar alinement substantially at or slightly below the plane of the top of the frame 35, and downwardly bent end portions 77, 79, respectively overlying and integrally secured, as by spot welding, to the flange portions 71 and to the rear wall 49 of the frame, on opposite sides of the parting line 50', a connection plate 80 overlying the inner face of the rear wall 49, between the end portions 77 and 79, said connection plate being spot welded to the abutting ends of the frame forming members 43, 43', on opposite sides of the parting line 50'. The mutually facing sides of the medial portions 75 may be formed with inclined flanges 81 which may be extended, as at 83, adjacent the rear wall to form spaced apart pedestal portions 85 comprising the inwardly bent terminal ends of the flange extensions.

The side walls 45 and 45', at their ends adjacent the rear wall 49, may each carry a corresponding suspension hook 87 comprising a formed piece of sheet metal having a base portion 89 spot welded or otherwise integrally secured on the wall on which the same is mounted, and a portion 91 bent at right angles from the portion 89 and extending inwardly of the wall to form the hook 87 disposed at an elevation substantially at or slightly above the plane of the top of the frame 35.

The front end of the frame 35 may be strengthened and made rigid by a bracing member 93 comprising a formed strip of sheet metal sized to extend along and in engagement with the inner face of the front wall 47 of the frame, the strip, at its opposite ends, being formed with extensions forming anchoring tabs 95 bent curvingly from the medial portions of the strip into position to engage the ends of the walls 45, 45', immediately adjacent the front wall 47, whereby the bracing member 93 may be fastened within the forward end of the frame 35 as an integral part thereof by spot welding the medial portions of the member to the wall 49 on opposite sides of the parting line 50, and by integrally uniting the end tabs 95 with the walls 45, 45', preferably by welding the parts together. The lower edge of the medial portion of the member 93, between the end tabs 95, may be formed with an inturned flange 97 in position to rest on and to be integrally secured to the inturned flange portions 57 along the lower edge of the front wall 47 of the frame. The upper edge portions of the member 93 may be formed with a pair of spaced vertical notches 99 to define a medial upstanding portion 101 for spot welded integration with the upper portions of the front wall 47 on opposite sides of the parting line 50, the upper edge portions of the member 93, outwardly of the slots 99, being bent over at right angles to form ledge flanges 103 having outer ends 103' resting upon, supported by, and, if desired, integrated as by welding with the upper edges of the end tabs 95.

As a consequence of such arrangement, the ledges 103, the tabs 95, and the connected portions of the member 93 form an exceedingly rigid structure at the outer ends of the ledges 103. These rigidly supported outer ends may be formed with openings 105 threaded to receive correspondingly threaded stems 107 having upper ends formed to support knife-edge bearing blocks 109, said upper ends of the stems 107 being shaped as pintles 111 adapted to fit turningly in corresponding sockets formed in the bearing blocks 109. The bearing blocks, in turn, may be formed with shallow knife blade receiving V-grooves 113, so that the bearing blocks may aline themselves with knife-edge pivot elements rockably mounted therein, by virtue of the ability of the bearing blocks 109 to turn upon their supporting pintles. A clamping nut 115 threaded upon each of the stems 107 in position to be tightened upon the ledge 103 around the stem 107 may be provided for securing the stem in vertically adjusted position, thereby determining the elevation at which the bearing blocks 109 are mounted in the frame 35.

The lever system 37 may comprise a pair of opposed lever elements 117 and 119 fulcrumed on the frame 35 adjacent its opposite ends and extending thence toward the middle of the frame. The levers are of substantially identical construction, each having a rectangular box-like portion 121, 121', of bent sheet metal forming the fulcrumed end of the lever, said box-like portion having substantially greater length than width and being sized to extend transversely across the frame 35 between its opposite side walls 45, the box-like portions of the levers 117 and 119 being disposed respectively within and adjacent the front and rear walls 47 and 49 of the support frame. The levers 117 and 119, also, may each comprise a sheet metal channel member forming an arm 123, 123', firmly and rigidly secured, at one end, in the box-like structure 121, 121', and extending thence outwardly of a side of the box-like lever portion, medially between its opposite ends, in a direction normal to its long sides.

The box-like lever portions 121, 121', may each be formed from a generally rectangular sheet 125 of metal, such as steel, having thickness of the order of one-sixteenth (1/16) inch, the sheet having corners cut away, as shown at 127, in FIG. 7 of the drawings, said cutout corners 127 delimiting a rectangular, central or medial portion 129, of greater length than width, the opposite side and end edges of which are defined along lines of bend 131 and 133 extending inwardly of and parallel to the opposite side and end edges of the sheet 125 and defining marginal side and end wall portions 135 and 137 extending from and outwardly of the medial portion 129 along the bend lines 131 and 133. The cutout corners 127 are configured to form tabs 139 at the opposite ends of the side wall portions 135, which tabs project beyond the opposite ends of the medial portion 129. The cutout corners are also shaped to provide ears 141 at the opposite end of the end wall portions 137, which ears project beyond the opposite sides of the medial portion.

The box-like structures 121 may be made by bending the end wall portions 137 downwardly of and at right angles with respect to the medial portion 129, along the bend lines 133. The side wall portions 135 may then be bent downwardly of and at right angles with respect to the medial portion 129, so that the tabs 139 may overlie the opposite ends of the end wall portions 137, with the ears 141 received in and projecting through openings 143 formed in the tabs 139. The inner or upper ends of the ears 141 may be slit, as at 145, to permit the tip of each ear, outwardly of the slit, to be bent over on the outer face of the tab through which it extends, in order to crimpingly secure the opposite ends of the side wall portions 135 against the ends of the end wall portions 137.

Each box-like lever portion 121, 121' may be strengthened and made rigid by means of a partition 147, of the sort shown in FIG. 8, secured therein adjacent and inwardly of and parallel with respect to each end wall portion. The partitions 147 are preferably configurated like the end wall portions 137, having ears 141', slit as at 145', at the opposite ends of the partitions, and a top edge 133' adapted to engage the underside of the medial portion 129 of the box-like structure. The partitions may each be provided with anchoring tongues 149, 149', projecting from and spaced apart along the top edge 133' in position to project through openings 151, 151' formed in the medial portion 129. The partitions may be anchored on and at right angles with respect to the medial portion by swaging the upper ends of the tongues 149, 149' over on the upper surface of the medial portion, as shown in FIG. 15. The partitions are preferably secured in place on the medial portion 129 prior to the bending of the side and end wall portions 135 and 137 on the bend lines 131 and 133. Accordingly, when the side wall portions are folded against the opposite ends of the previously bent wall portions 137, they will also engage the opposite ends of the partitions, the ears 141' of which will extend through openings 143' formed in the side wall portions 135 in position appropriately spaced inwardly of the openings 143. After the side wall portions have thus been folded down against the ends of the partitions 147 and the end wall portions 137, the projecting tips 144 of the ears 141 and 141', outwardly of the slits 145, 145' may be twisted laterally of the openings 143, 143' into locking engagement with the outer faces of the side wall portions 135, to fasten the parts together in box-like condition.

Midway between the opposite ends of the box-like lever portions, one of the side wall portions 135, which, for convenience, may be called the fulcrum side of the box-like structure, may be formed with a generally U-shaped opening 155, having a bottom edge 157 disposed inwardly of and parallel to the marginal edge of the sheet 125, and two side edges 159 extending normal to the bottom edge toward the bend line 131 and equally spaced from and on opposite sides of the medial transverse plane of the box-like portion, said opening being shaped to receive snugly therethrough and support the channel member which forms the arm portion 123, 123' of the lever member. Vertically opposite the opening 155, the other of the side wall portions 135, which, for convenience, may be called the fulcrum remote side of the box-like portion, may be formed with a pair of rectangular openings 161 equally spaced from and on opposite sides of the medial transverse plane of the box-like portion, the plane remote side edges of the openings being in registration with the spaced side edges 159 of the opening 155, transversely of the box-like portion. The medial portion 129 of each of the box-like structures 121 and 121' may be formed with an elongated opening or slot 163 centered on the medial transverse plane of the structure, said slot extending from near the middle of the medial portion 129 toward and into the fulcrum remote side wall, between the spaced openings 161.

Spaced a selected distance inwardly of the fulcrum side of the box-like structures, the end wall portions 137 and the partitions 147 are formed with substantially square fulcrum pivot openings 165 for the firm force-fitted reception therein of fulcrum pivot forming knife-edge elements, said openings 165 being disposed in longitudinal alinement, in the box-like structures, immediately inwardly of and adjacent the fulcrum sides thereof. Spaced selected distances away from the openings 165, toward the fulcrum remote side of the box-like lever structures, the end wall portions 137 and the partitions 147 may be formed with substantially square platform pivot receiving openings 167, 167' for the firm force-fitted reception therein of platform pivot forming knife-edge elements, said openings 167 and 167' being disposed in longitudinal alinement, in the box-like structures, the openings 167 being located substantially medially between the side wall portions 135, so as to support platform pivot elements in position to carry the weight receiving platform of the large range weighing scale shown in FIG. 1, while the openings 167' are located adjacent the fulcrum remote side of the box-like structure and hence further from the fulcrum pivot opening 165 than the large range scale platform pivot openings 167, whereby the openings 167' are in position to support platform pivot elements in position to carry the weight receiving platform of the small range weighing scale shown in FIG. 2.

While the fulcrum and platform carrying knife-edge pivot elements mounted in the openings 165, 167 or 167' may be of any preferred sectional configuration, with the openings appropriately shaped to press or force-fittingly receive the same, the present invention contemplates the use of knife-edge elements 169 of the sort shown in FIGS. 9 and 10, the same comprising cut lengths of standard steel bar stock having substantially square sectional shape. Indeed, the elements may have precisely square sectional configuration, if desired, or the slightly modified square shape shown in FIG. 10. The elements 169 may conveniently comprise pieces of bar stock of sufficient length to extend at one end in the fulcrum and platform pivot openings of the partitions, thence through the corresponding openings of the adjacent end wall portions 137 and outwardly thereof a distance sufficient to engage knife-edge bearings carried on the frame 35 and connected to the platform 39.

The arms 123, 123' may be formed each from a corresponding metal strip 171, 171', having thickness of the order of one-sixteenth ($\frac{1}{16}$) inch and generally rectangular configuration, as shown in FIGS. 11 and 12 of the drawings, said strips, at one end, having a tapered mounting portion 173 defined between mutually outwardly inclined side edges 175 extending from one end 177 of the strip toward its medial portions where the mounting portion is connected with a pivot carrying portion 179. The pivot carrying portion is preferably of rectangular configuration having opposite parallel sides 181. If desired, shoulders 183 facing toward the end 179 of the strip may be formed at the junction of the mounting and pivot carrying portions 173 and 179. Each strip, at its end 177, may be formed with a pair of ears 185, which project outwardly of said end on each side of the strip, said ears being formed with slits 187 extending from the side edges 175 inwardly of the ears on a line parallel with and spaced outwardly of the end 177 a distance substantially equal to the thickness of the plates 125 of which the box-like lever portions 121 and 121' are formed.

At a predetermined distance from the end 177, each of the strips may be formed with a pair of transversely aligned, substantially square openings 189 sized to press-fittingly receive knife-edge pivot elements 169 therein. The strip 171', at its end remote from the ear carrying end 177, terminates adjacent the pivot openings 189, while the strip 171 extends a substantial distance beyond the pivot openings, which may be disposed substantially midway between the opposite ends of the strip. The longer strip 171, inwardly of its end 177, may be formed with a perforation 191 midway between the opposite ends of the strip. The shorter strip 171', inwardly of its end 177, may be formed with an elongated slot 191' extending medially between the opposite sides of the strip. The longer strip 171, at its end remote from its ear carrying end 177, may be formed with an elongated slot 193 extending midway between the opposite sides 181 of the strip, the inner end of the slot being preferably squared. Spaced inwardly from said square end of the slot 193, the strip 171 may be formed with a rectangular hole 195 in longitudinal alinement with the slot 193. The strip 171 also may be formed with an elongated slot 197 medially between the pivot openings 189, said slot preferably having mutually facing points 199 in abutting relationship formed on opposite sides of the slot midway between its ends.

The opposite sides 201 of the strips may be bent at right angles with respect to their medial portions 203, along parallel bend lines 205, in order to form the channel-shaped arms 123 and 123' in which the openings and slots 191, 191', 193, 195 and 197 are disposed in the medial portions 203, midway between the opposite sides 201, the pivot openings 189 being disposed in alinement transversely of the arms in position to press-fittingly receive pivot pins 169 therein, with the medial portions of the pins extending between the spaced apart, parallel sides 201. In thus bending the opposite sides of the longer strip 171, its opening 197 may be distorted from its shape, shown in FIG. 11 and in dashed lines in FIG. 17, to assume the shape shown in solid lines in FIG. 17, in which the triangular portions forming the points 199 are moved with the side 201 and, as shown in FIG. 13, lie in the plane of said sides when bent to form the channel member 123. The opening 197 in the channel member thus permits the levers 117 and 119 to be drivingly interconnected by means of a shackle link 207 extending in the opening 197 and connecting with the pivot elements 169 which are secured in the openings 189 of the arms 123 and 123'.

Any suitable or preferred form of link may, of course, be employed to drivingly connect the levers 117 and 119. As shown, in FIG. 5, the link may comprise a C-shaped strip of metal, such as steel, the opposite ends 209 of which are adapted to rockably engage the knife-edges provided by the corners of the elements 169; and, after the link has been assembled in operative position on the knife-edge elements 169, it may be secured against accidental removal or displacement by means of a cotter pin 211 applied in perforated lugs 213 formed on the opposite ends 209 of the link, in position to close the opening between said opposite ends.

The channel-shaped arms 123 and 123' may be mounted on their corresponding box-like lever portions by applying the tapering mounting portions 173 thereof through the openings 155 of the box-like portions, and by inserting the ears 185 into and through the openings 161. When so positioned, the ends 177 of the arms will be in snug engagement with the inner face of the fulcrum side 135 of the box-like lever portion, the medial portion 203 of the arms will be in firm engagement with the lower edge 157 of the opening 155, by virtue of the wedge action of the inclined edges 175 upon the tops of the spaced side portions of the slots 155, and the tips of the ears 185, outwardly of the slits 187, will project outwardly of the fulcrum side 135 of the box-like lever component. The arms 123 and 123', accordingly, may be secured firmly and wedgingly in the box-like components merely by twisting the projecting portions of the ears mutually outwardly of the openings 161 into engagement with the outer surface of the fulcrum side 135 of the box-like components, as shown in FIGS. 13 and 20.

The short lever 119 may be pivotally mounted or fulcrumed on the base 35 by applying its fulcrum pivots FP in stirrups 215 suspended from the hooks 87 mounted adjacent the rear corners of the base 35, the lever arm 123' extending through the opening 69 of the partition 63 to present its connection pivot CP at the center of the support base. The stirrups 215, as shown in FIGS. 22, 23 and 24, may each comprise an elongated, flat suspension plate 217 of metal, such as steel, formed with an opening 219 at one end for receiving the hook 87, to mount the stirrup swingingly thereon, the plate having another opening 221, at its other end, for receiving and mounting a bearing plate 223. The bearing plate 223 is generally rectangular and is bent along a medial bend line 225 to provide wings 227, mutually inclined at an angle of the order of 125 degrees, said wings being formed with medial slots 229 defining spaced fingers 231 at the outer ends of the wings 227.

The opening 221, at its end remote from the suspension opening 219, has a V-shaped portion 233 conformed with the inclination of the wings 227. At its end opposite said V-shaped portion, the opening may connect with a slot-like extension 235, so that the bearing plate may be assembled on the plate 217 by inserting the bearing plate edgewise into the opening 221 including the slot portion 235, and then turned 90 degrees in the opening to receive the opposed edges of the plate 217, which define the opening 221, loosely in the slots 229, to thereby interlock the fingers 231 with the opposed faces of the plate 217 at the opening 221 and secure the bearing plate 223 on the suspension plate 217, with the mutually inclined wings of the bearing plate resting on the V-shaped bottom 233 of the opening 221, for limited transverse rocking movement, to thus permit the bearing plate to adjust itself to the fulcrum pivot of the lever.

The long lever 117 may be pivotally mounted or fulcrumed on the support base 35 by applying its fulcrum pivots FP directly on the bearings 109 that are mounted at the front corners of the base, the lever arm 123 extending medially of the base, toward the rear wall 49 thereof, and above the arm 123' of the short lever 119. The outer end portions of the long lever extend above and medially of the box-like portions 121' of the short lever 119 and between the spaced pedestal supporting bracket portions 83 at the rear of the frame, the connection pivot CP of the long lever being presented centrally of the frame 35 vertically above the connection pivot CP of the short lever; so that the lever connecting shackle 207 may readily be applied to the connecting pivots after the levers have been mounted on the fulcrum bearings 109 and 223.

As shown in FIG. 26 of the drawings, the weighing platform 39 may comprise a preferably steel panel 236 which may be formed with a peripheral downwardly turned rigidifying flange 237 at its marginal edges. The panel may be further strengthened by a bracing plate 239 extending across and fastened rigidly, as by spot welding, to the underside of the panel, said plate having dependent flanges 241 forming legs at the opposite sides of the platform immediately inwardly of the marginal flanges 237. The dependent leg flanges 241 preferably extend normal to the medial panel connected portions of the plate 239, and are mutually inclined slightly inwardly from the front toward the rear of the platform; and diagonal bracing ribs 243 may be formed between the flanges 241 and the medial plate of the plate 239 to hold the flanges rigidly at right angles with respect to the platform. A downwardly opening notch 245 may be formed in the lower edge of the flanges 241, adjacent their forward ends, said notches being in alinement transversely of the platform in position to receive and support the opposite ends of a bar 247 of rectangular sectional shape, which extends between the dependent flanges 241 and has notches 249 formed in the lower edge of said bar, adjacent and inwardly of the leg flanges 241.

The platform is suspended on the platform carrying pivots PP of the long lever 117 by means of stirrups 215', preferably identical to the stirrups 215, the bearing plates 223 of the stirrups 215' rockably engaging the platform pivots PP at the opposite ends of the box-like portion of the lever 117, and the bar 247 extending through the openings 219 of the stirrups 215' and rockably engaging said bar at the notches 249. The forward edges of the flanges 241, above the notches 245, may be cut away as at 251 to accommodate the pivots PP and their bearings 223.

A knife-edge bearing 253 may be formed on the lower edge of each of the leg flanges 241 at its rearward end, said bearings being in position to rockably engage the platform pivots PP at the opposite ends of the box-like portion of the lever 119. The bearings 253, as shown in FIGS. 27 and 28, may comprise each a plate 255 of metal, such as steel, bent on a medial bend line to form wing portions 257 mutually inclined at an angle of the order of 125 degrees, the edges of the wing portions being formed with medial slots 259 providing spaced lugs 261 at the opposite sides of the bearing. The flanges 241, at the rearward sides of their bottom edges, are each formed with a shallow V-shaped notch 263 conforming with the inclination of the wing portions, and a pair of upstanding fingers 265 at the opposite ends of the notch. Each bearing 253 may be mounted in its corresponding notch 263 for limited transverse rocking movement therein, with the notches receiving the bottom of the fingers 265, the tops of which may be bent down each upon one of the lugs on the opposite sides of the bearing. The bearings are positioned to rest upon the platform pivots PP of the lever 119, when the platform is applied in position covering the top of the frame 35. The platform panel 236 also may be formed with a preferably rectangular opening 266 centrally located at and inwardly of the rear of the platform to freely accommodate the upstanding support pedestals 85.

In order to hold the parts together in assembled relationship, the leg flanges 241 may be provided each with a threaded opening 267 adapted to receive a screw 269 applied therethrough from the inner side of the flange. The openings 267 are preferably in transverse alinement and at an elevation such that the outwardly projecting stem of the screw 269, when applied through the flange, will extend immediately beneath and slightly spaced below the inturned flange portions 55 of the base, and so retain the platform against upward removal from the base and the base carried levers.

In order to connect the lever systems 37 with suitable weight counterbalancing and weight indicating means, the fulcrum remote end of the lever, as shown in FIG. 18, may be provided with an adjustable attaching bracket 271 comprising a strip 273 of metal, such as steel, having an attaching opening 275 formed therein at one end for connection with a link 277 drivingly associated with counterbalancing and weight indicating mechanism. The strip may also be formed with a pair of longitudinally spaced, preferably rectangular openings 279 disposed inwardly of its opposite end, and a medial threaded opening for the reception of a clamp screw 281. The clamp screw is adapted to attach the bracket 271 on the fulcrum remote end of the lever 119. For such purpose, the screws may extend in the slot 193 of the lever, whereby the bracket may be adjusted longitudinally of the lever with the screw moving in the slot. By tightening the screw in the strip 273, it may be secured in adjusted position, with the openings 279 disposed above the opening 195 of the lever arm.

The spacing of the openings 279 being unlike the spacement of the opening 195 from the adjacent end of the slot 193, the square configuration of the slot end and of the openings 195 and 279 facilitates the longitudinal adjustment of the bracket strip on the lever arm in response to prying action of a tool, such as a screwdriver, which may be inserted in the opening 195 or the squared end of the slot 193 into prying engagement with the edges of the openings 279. The prying tool may be inserted from the open bottom of the frame, through the slots 191' and 163 in the box-like and arm components of the lever 119, and thence into adjusting engagement with the bracket 271.

Any suitable, preferred or conventional means may, of course, be connected with the weighing levers to counterbalance a weight applied on the platform for measurement and for indicating the measured weight. In this connection, many of the novel aspects of the invention are not dependent upon, nor limited by the nature of the weight counterbalancing means, nor the weight indicating means that may be employed in conjunction with the lever system of the present invention. Indeed, the herein described lever system may, if desired, be used in conjunction with a conventional weighing spring to measure weight in terms of spring extension, and a conventional lever driven indicator calibrated to show spring extension in terms of corresponding units of weight. The present disclosure, however, shows the lever system 37 suspended on counterbalancing means comprising a steel yard weighing beam B instead of a conventional weighing spring, the beam embodying counterweights longitudinally adjustable thereon for balancing purposes, and weight indicating means comprising graduated scales to indicate measured weights in terms of the adjusted positions of the counterweights on the weighing beam.

As shown, the weighing beam is tiltably mounted at the top of a pedestal structure 282 supported on and extending upwardly of the pedestal support brackets 85, said pedestal structure preferably comprising a hollow sheet metal tube 283 secured at its lower end, as by means of fastening screws 285, upon the mounting portions 85 of the pedestal support brackets, the upper end of the tube 283 carrying a preferably hollow sheet metal support beam 287 having a bottom opening 289, defined between inturned flanges 291, said beam extending transversely of the weighing scale structure. At its upper end, the tubular pedestal portion 283 may be formed with spaced upstanding extensions 293 projecting within the hollow beam 287 through the opening 289 and firmly secured, as by spot welding the same, respectively to the inner faces of the front and rear walls thereof, medially of its opposite ends.

A knife-edge bearing support pedestal 295 may be mounted on the beam in position extending upwardly thereof, said pedestal preferably comprising an inverted U-shaped bracket having medial portions secured to the beam, preferably by spot welding, and spaced upstanding leg portions carrying alined knife-edge supporting bearings 297 at the top thereof. Said bearings may conveniently comprise elements similar to the bearing elements 253, as shown in FIGS. 27 and 28, and may be mounted at the tops of the legs of the bracket 295 by means of fingers formed on said legs, like the fingers 265 on the flanges 241.

The steel yard beams B may comprise a pair of end members 301 and 303 forming the opposite ends of the beam, and a plurality of bracing and spacing members extending between and rigidly secured to the end members, including a top member 305 and a back member 307 of formed sheet metal, a front member 309 and a rod 311. The end members 301 and 303 may conveniently comprise die formed plates of plastic material of generally rhomboidal peripheral configuration having parallel front and rear edges 313 and 315, a bottom edge 317 normal to the front and rear edges, and a top edge 319 inclined upwardly from the front toward the rear edge at an angle of the order of 110 degrees with respect to the front edge. The inner or facing sides of the plates 301 and 303 may be formed with grooves 321 and sockets 323 parallel to and immediately inwardly of the edges of the plates for the recetpion of the ends of the panel members 305 and 307, the bar member 309 and the rod 311. On the inner sides of the plates, the opposite ends of the members 307 and 309 may be secured, as by rivets 325, to flanges formed at the opposite ends of spacing bars 327, which may be secured to the inner sides of the end members 301 and 303, as by means of fastening screws 329. The opposite ends of the rod 311, in the sockets 323, may be secured to the end plates, as by means of fastening screws 331.

The beam may be provided with a transversely extending knife-edge pivot 333 between the end plates 301 and 303 and somewhat closer to the end plate 301, thereby constituting the end plate 303 as the swinging end of the beam, said end plate being formed with a preferably integral outstanding finger 335 loosely confined in an opening 337 formed in a preferably sheet metal strip 339 secured, as by spot welding, to and upstanding from an end of the hollow beam 287. The beam mounted end of the strip extends within the beam and is secured to the inner surface of its end and projects thence through an opening 341 formed in the beam wall.

The panel member 305 may be formed with inwardly bent flanges 343 and 345 along its upper and lower edges, to strengthen and rigidify the same against transverse bending; and an upstanding flange 347 may be formed at the terminal edge of the flange 343 to further strengthen the member 307, the flanges 343 and 347 forming a longitudinally extending pocket partially enclosing the front and bottom sides of the rod 311. The panel member 305 may form the top wall of the hollow beam structure from the forwardly of the flange 347, and the forward edge of said member 305 may form a dependent flange 349 covering the upper portions of the front of the beam and defining a slot 351 between the lower edge of the flange 349 and the upper edge of the bar member 309, which may be formed with a series of spaced notches 353.

A counterbalancing weight element 355, preferably comprising a rectangular piece of steel or other convenient material of selected size and a preferably cylindrical handle 357 connected to the weight element by means of one or more connection rods 359, at least one of which is formed with a downwardly facing knife-edge, may be mounted on the beam B for adjustment longitudinally thereof, as by disposing the steel weight element 355 within the hollow beam immediately behind the slot 341, with the handle 357 and connection rods, respectively, extending in front of and through the slot 351. The knife-edge connecting rod or rods 359 may each conveniently comprise a pin of square sectional configuration fixed at opposite ends in the weight and handle elements, with a corner edge of the pin facing downwardly in position to engage in any of the notches 353 to hold the weight in adjusted position on the beam. The handle 357 may be formed with a peripheral groove 361 adapted to form an index to show the adjusted position of the weight on the beam in terms of weight units on an indicating scale 363 marked on the panel 305 or on the flange 349 or both. The counterbalance element 355 is adapted for gross adjustment by weight increments of substantial size.

The rod 311, medially of its opposite ends, may be supported in a bracket 365, which may be conveniently formed as a molded plastic element. The bracket may be secured on the panel member 307, in the groove formed by its flanges 343 and 347, by suitable fastening means, such as a screw 367. A counterbalance weight element 369 for fine adjustment by weight increments of minimal value may be mounted on the rod 311 for adjustment longitudinally of the beam, between the support bracket 365 and the swinging end 303 of the beam. The element 369 may conveniently comprise a cylindrical block of metal or other suitable material formed with an axial bore for slidingly receiving the rod 311, the cylindrical block being preferably formed with a medial peripheral groove 371 adapted to form an index for indicating the adjusted position of the element on a weight scale 373. A zero setting balance weight element 375, preferably comprising a cylindrical block of metal or other suitable material and having an axial bore for slidably receiving the rod 311, may be mounted for adjustable movement on the rod 311 between the bracket 365 and the end plate 301. A set screw 377 may be provided to secure the element in adjusted position on the rod 311.

The beam fulcrum pivot 333 may comprise a pin having square sectional shape, like the pins 169 used for the fulcrum, platform and connecting pivots in the lever system 37, the pivot 333 being press-fitted in an opening formed in a preferably steel mounting plate 379, said mounting plate extending within the hollow beam structure, between the front and rear beam members 309 and 307, and having a rearwardly extending flange 381 formed along its upper edge, the flange being secured, as by rivets 383, to the flange portion 343 of the panel 307. The pivot pin 333 projects on opposite sides of the plate 379 in position to rest rockingly on the knife-edge bearings 297; and to retain the pin 333 against axial displacement on the bearings 297, a pair of retaining members 385 may be secured, as by spot welding the same, to the outwardly facing sides of the bearing pedestal legs 295 in position overlying the opposite end of the pin 333 in the bearings 297.

Spaced away from the pin 333, and on the side thereof remote from the swinging end 303 of the beam B, the mounting plate 379 may carry a knife-edge pivot element 387, like the pivot pin 333, and press-fitted in an opening in the plate, with the opposite ends of the pin projecting at the opposite sides of the plate in position to rockingly engage knife edge bearings 389, similar to the bearings 223 of the stirrups 215, the bearings 389 being mounted at the ends of the legs of a U-shaped stirrup 391 the medial portions of which depend beneath the plate 379.

Any suitable or preferred means may be employed to connect the stirrup 391 with the weighing lever system 37. As shown, the connection may be made through a multiplying lever 393 disposed in the hollow housing formed by the beam 287. The multiplying lever has its opposite ends suspended respectively from an anchoring hook 394, attached in the housing 287, and from a link 395 rockingly connected with the medial portions of the stirrup 391, the ends of the lever being so connected as by means of swinging stirrups 397 and lever mounted pivot pins 399, like the stirrup 391 and pin 387, the hook 394 being mounted in the end of the housing which extends beneath the swinging end 303 of the weighing beam B, and the link 395 extending through an opening 401 formed in the top of the housing 287 beneath the pivot 387.

The lever 393 may be drivingly connected with the lever system 37 by means of a pivot pin 403 fitted in and through the lever medially between the pins 399, the pins 399 and 403 preferably being identical and mounted in identical fashion in the lever 393. The oppositely extending ends of the pin 403 may be connected with the knife-edge bearing elements of a stirrup 405, that may be and preferably is identical to the stirrups 391 and 397, the medial portions of the stirrup being rockably connected with one end of the link 277, the other end of which is rockably connected with the bracket 271 mounted at the fulcrum remote end of the long lever 117.

If desired, an upstanding member 407 may be secured on the housing 287 in position opposite the end of the plate 379 of the weighing beam B which faces away from its swinging end to restrict beam movement in one longitudinal direction, with respect to the pivot support bearings 297, beam movement in the opposite direction being limited by the bracket 339. The bracket and the member 407, thus, without interfering with the weighing movement of the beam on the bearing 297, will retain the beam from displacement from operative position.

As shown in FIG. 31, the gross and fine adjustment scales 363 and 373 for the wide range weighing scale shown in FIGS. 1 and 3 may be graduated respectively in fifty pound increments up to three hundred and fifty pounds, and in one pound increments up to fifty pounds. As shown in FIG. 32 of the drawings, the gross and fine adjustment scales 363 and 373 for the small range weighing scale shown in FIGS. 2 and 4 may be graduated respectively in one pound increments up to thirty-four pounds, and in one ounce increments up to sixteen ounces.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A weighing scale embodying a support base, a system of levers fulcrumed on said base, a weight receiving platform supported on said levers, and means connected with the lever system for resisting movement thereof under the influence of a platform supported weight to be measured and for indicating the amount of said weight, said system including a lever comprising a box-like sheet metal component having a medial portion and integral depending wall portions connected with the peripheral edges of the medial portion, said depending wall portions including spaced end flange portions, at the opposite ends of the component, and spaced side flange portions, at the opposite sides of the component, and aligned knife-edge forming pivot rods press fitted in openings formed in said spaced end flange portions, said rods extending through and outwardly of said wall portions, at the opposite ends of said box-like component, and an arm secured to the spaced side flange portions, on the opposite sides of the box-like component, medially between and normal to said aligned pivot rods, said arm projecting outwardly of one side of said box-like component.

2. A weighing scale as set forth in claim 1, wherein said arm is a sheet metal channel member secured to the sides of the box-like component medially between its pivot carrying ends.

3. A weighing scale as set forth in claim 1, wherein the meeting ends of the side and end flange portions being rigidly secured together at the corners of said medial portion.

4. A weighing scale as set forth in claim 3, wherein the end of a said flange portion is formed with a slot for receiving a tongue on the end of an adjacent flange portion, the end of the tongue projecting outwardly of the slotted flange portion and being twisted to secure the parts together.

5. A weighing scale as set forth in claim 3, wherein said arm is a sheet metal channel member extending through a U-shaped opening in the dependent flange portion forming one side of the box-like component, an end of the channel member abutting the dependent flange portion forming the opposite side of box-like component, said opposite side being formed with a slot for receiving a tongue on the abutting end of said channel member, the end of said tongue projecting outwardly of the slotted side and being twisted to secure the parts together.

6. A weighing scale as set forth in claim 1, wherein the box-like portion has a partition spaced inwardly of and parallel to its end wall, and a said knife-edge pivot extends through and is press-fitted in alined openings in said end wall and partition.

7. A weighing scale as set forth in claim 1, including a bracket formed for connection with said means and secured for adjustment longitudinally on said arm, at its end remote from the box-like pivot carrying component, for movement toward and away from said pivot carrying component.

8. A weighing scale embodying a support base, a system of levers fulcrumed on said base, a weight receiving platform supported on said levers, and means connected with the lever system for resisting movement thereof under the influence of a platform supported weight to be measured and for indicating the amount of said weight, said system including a lever having a knife-edge fulcrum pivot carrying section and a sheet metal channel forming an arm secured to said section, at one end, and projecting therefrom in a direction normal to said pivots, and a bracket formed for connection with said means and secured for adjustment longitudinally on said arm, for movement toward and away from said pivot carrying section, said bracket comprising a sheet metal strip clampingly secured to and overlying the end of said sheet metal arm, said strip and the strip overlaid portions of the arm being formed with openings for the reception of a strip prying tool to facilitate longitudinal adjustment of the strip on the arm.

9. A weighing scale embodying a support base, a system of levers fulcrumed on said base, a weight receiving platform support on said levers, and means connected with the lever system for resisting movement thereof under the influence of a platform supported weight to be measured and for indicating the amount of said weight, said system including a pair of opposed levers each comprising a pivot carrying component fulcrumed respectively at the opposite ends of the base, said components each having a medial portion and integral depending wall portions connected with the peripheral edges of the medial portion, said depending wall portions including spaced end flange portions, at the opposite ends of the component, and spaced side flange portions, at the opposite sides of the component, and aligned knife-edge forming pivot rods press fitted in openings in said spaced end flange portions, said rods extending through and outwardly of said wall portions, at the opposite ends of said box-like component, said levers each also comprising a sheet metal channel forming an arm having spaced side walls and secured to the spaced side flange portions on the opposite sides of a said box-like component, medially between and normal to said aligned pivot rods, said arms each projecting from its associated pivot carrying components toward a connection station medially between the fulcrum pivots of said levers, a connection pivot secured on and between the spaced side walls of the arms of each lever at said station, and a shackle rockably connected with said connection pivots.

10. A weighing scale as set forth in claim 9, wherein the arm forming channel of one lever extends above the arm forming channel of the other and is provided with an opening in its bottom, and a shackle extending in said opening and rockably connected with said knife-edge pivots.

11. A weighing scale embodying a support base, a system of levers fulcrumed on said base, a weight receiving platform supported on said levers, and means connected with the lever system for resisting movement thereof under the influence of a platform supported weight to be measured and for indicating the amount of said weight, said system of levers comprising suspension links each comprising a strip of sheet metal having a perforation at one end for the rockable engagement of the link with a mounting bearing and a mounting opening at the other end for the detachable and rockable support of a knife-edge bearing on said link, said mounting opening having a relatively wide bearing receiving portion defining a V-shaped edge on one side and a relatively narrow slot-like extension on the other side, and a sheet metal bearing plate bent along a line medially of its opposite sides to form mutually inclined wing portions, the line remote sides of said wing portions being formed with medial notches to receive the opening defining edges of said strip at the opposite ends of said V-shaped edge when said bearing plate is seated thereon, whereby the plate may be mounted in seated position by inserting it endwise through the opening and its extension into position registering said notches with the opening defining edges of the strip and then rotating the bearing plate in said opening to seated position on said V-shaped edge.

12. A weighing scale embodying a support base, a system of levers fulcrumed on said base, a weight receiving platform supported on said levers, and means connected with the lever system for resisting movement thereof under the influence of a platform supported weight to be measured and for indicating the amount of said weight, said scale having a sheet metal leg formed with a shallow V-shaped notch providing a knife-edge bearing seat at an edge of said leg, a projecting finger formed on the leg at each of the opposite ends of said seat, and a sheet metal bearing plate rockably supported on said seat, said plate being bent along a line medially of its opposite sides to form mutually inclined wing portions, the line remote sides of said wing portions being formed with medial slots between spaced ears to receive said fingers, at the opposite ends of said V-shaped notch, when said bearing plate is seated thereon, whereby the so mounted plate will be held against movement transversely of the seat, said fingers being bent downwardly each upon a corresponding one of said ears to hold the bearing plate upon said seat.

13. A weighing scale embodying a support base, a system of levers fulcrumed on said base, a weight receiving platform supported on said levers, and means connected with the lever system for resisting movement thereof under the influence of a platform supported weight to be measured and for indicating the amount of said weight, said levers having platform support pivots alined transversely of the scale, and said platform comprising a weight receiving panel and a formed sheet metal bracing plate, said plate having a medial portion secured to and beneath the panel and a pair of dependent leg forming flanges at the opposite sides of the platform, said flanges having lower edges each formed with a downwardly opening slot, said slots being disposed in alinement transversely of the platform, a metal strip forming a platform suspension bar extending at its opposite ends in said slots and beneath a pair of said transversely alined platform support pivots, and a link pivotally connected with each of said pivots and with said suspension bar at each end adjacent said dependent leg forming flanges for supporting the suspension bar and the platform carried thereby upon said platform support pivots of the levers.

14. A weighing scale embodying a support base, a system of levers fulcrumed on said base, a weight receiving platform supported on said levers, and means connected with the lever system for resisting movement thereof under the influence of a platform supported weight to be measured and for indicating the amount of said weight, said means comprising a hollow structure embodying a pair of spaced end members and longitudinally extending metal members secured at their opposite ends on said end members, said hollow structure forming a steel yard weighing beam fulcrumed intermediate its ends and within the hollow structure upon a bearing mounted on said support base, said beam being drivingly connected with said levers and having counterpoise weights adjustable longitudinally thereof along weight indicating scales formed on a said longitudinally extending member of the hollow beam structure.

15. A weighing scale as set forth in claim 14, wherein the end members of the hollow beam structure comprise plates formed with sockets shaped to receive the ends of the longitudinaly extending members of the structure.

16. A weighing scale as set forth in claim 14, wherein the beam structure comprises a longitudinally extending rod having a counterpoise weight element snugly embracing said rod and free for sliding adjustment longitudinally thereof, and a scale formed on a said longitudinally extending member, alongside of said rod, in order to indicate the weight of an object, on the platform, in terms of the position of the counterpoise element longitudinally of the rod.

17. A weighing scale as set forth in claim 14, wherein the beam structure comprises a longitudinally extending sheet metal panel formed with a strengthening flange along an edge thereof, a longitudinally extending support member disposed adjacent and parallel to said flange, and a counterpoise weight supported for movement on and longitudinally of said member adjacent said flange.

18. A weighing scale embodying a support base, a system of levers fulcrumed on said base, a weight receiving platform supported on said levers, and means connected with the lever system for resisting movement thereof under the influence of a platform supported weight to be measured and for indicating the amount of said weight, said support base comprising sheet metal means forming upstanding front, rear and opposite side walls, a strip of formed sheet metal bracing the front wall and carrying fulcrum pivot bearings for a said lever at the opposite ends of said front wall, said strip of sheet metal having a medial portion extending across and secured to the inner face of said front wall and opposite end portions extending normal to the medial portion in position to engage said opposite side walls at the ends thereof adjacent said front wall, the upper portions of said strip, at its opposite ends, forming inturned normal flanges having ends bearing upon said normally extending opposite end portions of the strip, and knife-edge bearing support pedestals secured in said inturned normal flanges.

19. A weighing scale embodying a support base, a system of levers fulcrumed on said base, a weight receiving platform supported on said levers, and means connected with the lever system for resisting movement thereof under the influence of a platform supported weight to be measured and for indicating the amount of said weight, said support base comprising sheet metal means forming upstanding front, rear and opposite side walls, a sheet metal bracing strip having a narrow and a wide marginal flange along its opposite sides and secured at its ends to the side walls of the base medially between the front and rear end thereof, said wide flange being formed with a central lever accommodating opening therethrough, and a pair of spaced brackets secured at their opposite ends respectively to said wide flange on opposite sides of said openings and to the rear wall of said base, said brackets forming support pedestals extending upwardly of the platform through a central opening in the rearward portions of the platform, said weight counterbalancing and weight indicating means on the scale being supported on said support pedestals above the platform.

References Cited
UNITED STATES PATENTS

| | | | |
|---|---|---|---|
| 1,273,155 | 7/1918 | Devitt | 177 |
| 1,572,328 | 2/1926 | Taylor | 177—257 |
| 2,639,912 | 5/1953 | Brown | 177—257 |
| 2,668,045 | 2/1954 | Provenzano | 177—257 |
| 2,728,568 | 12/1955 | Sudbrink | 177—247 X |
| 2,850,202 | 9/1958 | Schneider et al. | 29—513 X |
| 3,027,958 | 4/1962 | Gabloffsky | 177—247 |
| 3,193,034 | 7/1965 | Hutchinson et al. | 177—234 |

RICHARD B. WILKINSON, *Primary Examiner.*

STEPHEN I. TOMSKY, *Examiner.*

G. H. MILLER, JR., *Assistant Examiner.*

UNITED STATES PATENT OFFICE
CERTIFICATE OF CORRECTION

Patent No. 3,369,621                  February 20, 1968

William Y. Hutchinson et al.

It is certified that error appears in the above identified patent and that said Letters Patent are hereby corrected as shown below:

Column 14, line 71, after "of" insert -- said --. Column 18, line 22, "openings" should read -- opening --.

Signed and sealed this 20th day of January 1970.

(SEAL)
Attest:

Edward M. Fletcher, Jr.            WILLIAM E. SCHUYLER, JR.
Attesting Officer                     Commissioner of Patents